May 10, 1966 W. L. MITCHELL 3,251,060
PROFILOSCOPE
Filed Nov. 20, 1957 9 Sheets-Sheet 1

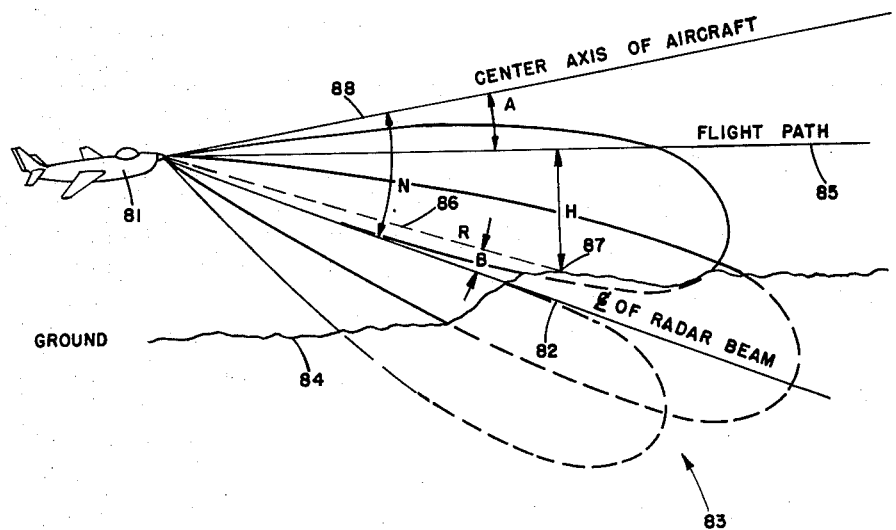

N = ELEVATION ∠ OF ANTENNA

A = ATTACK ∠ OF AIRCRAFT

B = ∠ DEVIATION OF GROUND RETURN FROM BEAM CENTER

H = PERPENDICULAR DISTANCE FROM THE FLIGHT PATH TO THE POINT UNDER OBSERVATION

R = INSTANTANEOUS SLANT RANGE TO ANY POINT ON THE GROUND

ANGLE EXAGGERATED FOR PURPOSE OF ILLUSTRATION

FIG. 1

*INVENTOR.*
WILBUR L. MITCHELL
BY Allan Rothenberg
ATTORNEY

INVENTOR.
WILBUR L. MITCHELL
BY
ATTORNEY

May 10, 1966  W. L. MITCHELL  3,251,060
PROFILOSCOPE
Filed Nov. 20, 1957  9 Sheets-Sheet 3

INVENTOR.
WILBUR L. MITCHELL
BY Allan Rothenberg
ATTORNEY

May 10, 1966 W. L. MITCHELL 3,251,060
PROFILOSCOPE
Filed Nov. 20, 1957 9 Sheets-Sheet 4

INVENTOR.
WILBUR L. MITCHELL
BY
*Allan Rothenberg*
ATTORNEY

INVENTOR.
WILBUR L. MITCHELL

BY Allan Rothenberg

ATTORNEY

May 10, 1966  W. L. MITCHELL  3,251,060
PROFILOSCOPE

Filed Nov. 20, 1957  9 Sheets-Sheet 7

INVENTOR.
WILBUR L. MITCHELL
BY Allan Rothenberg
ATTORNEY

May 10, 1966  W. L. MITCHELL  3,251,060
PROFILOSCOPE

Filed Nov. 20, 1957  9 Sheets-Sheet 8

*INVENTOR.*
WILBUR L. MITCHELL
BY
ATTORNEY

May 10, 1966 W. L. MITCHELL 3,251,060
PROFILOSCOPE
Filed Nov. 20, 1957 9 Sheets-Sheet 9

INVENTOR.
WILBUR L MITCHELL
BY
ATTORNEY

United States Patent Office 3,251,060
Patented May 10, 1966

3,251,060
PROFILOSCOPE
Wilbur L. Mitchell, Anaheim, Calif., assignor to North American Aviation, Inc.
Filed Nov. 20, 1957, Ser. No. 698,893
17 Claims. (Cl. 343—16)

This application relates to flight aids for aircraft pilots and avoidance of obstacles.

An object of the invention is the accomplishment of safe flight under difficult conditions where the pilot is required to fly as close to the ground as possible, conveying information to the pilot of obstructions along or on each side of a proposed flight path.

A more specific object of the invention is warning the pilot of the nature of the terrain and information of indications thereof.

A further object of the invention is to produce ground profile and terrain clearance data reflectively without necessity for scanning in elevation.

Still another object is to combine ground profiling functions with normal target locating and tracking functions of normal radar apparatus.

An additional object is the compensation of reflected radar signals in such a manner as to obtain signal strength indicative of the angle from which the reflections are received independent of range and target size.

Another object is to produce an appropriate display upon a cathode ray screen, revealing to a pilot location in azimuth and range of ground obstructions.

Other and further objects, features, and advantages of the invention will become apparent as the description proceeds.

In carrying out the invention, a simultaneous lobing or monopulse radar system is utilized which is preferably beamed toward the ground with the monopulse antenna at a predetermined depression angle. As is well-known, a monopulse radar utilizes a set of simultaneous antenna radiation lobes to obtain complete tracking information from the target echo each time a pulse is transmitted and received. The echo signals are combined to produce a sum signal and an error signal which are respectively indicative of range and displacement in elevation of the target from the center of the radar beam. For simplification in the mechanization of the relevent equation, a special receiver is employed in which error signals are received and the output is controlled by the magnitude of sum or range signals. For example, the data in the sum channel may be used to control the gain in the elevation difference or error channel. The signal in the elevation difference channel is then dependent primarily upon the elevation angle of the target area relative to the center of the beam.

This information is utilized to warn the pilot of dangerous obstructions ahead of him.

A cathode ray tube screen may be employed with a display which presents a plot of the location in range and azimuth of surfaces from which radar waves are reflected with the intensity of the display modulated by the elevation error angle signal. In this manner, the presence of bright spots on the screen warns of obstructions and their positions represent the location in azimuth and range of ground obstructions. The invention, however, is not limited to a particular method of utilizing the relationship between sum signals and error signals to provide a warning to the pilot of inadequate ground clearance.

A better understanding of the invention will be afforded by the following detailed description considered in conjunction with the accompanying drawings in which:

FIG. 1 is a diagram illustrating the principle of operation of the invention, showing the location of an aircraft with relation to ground and the geometry of a ground proximity warning system;

Figure 2:
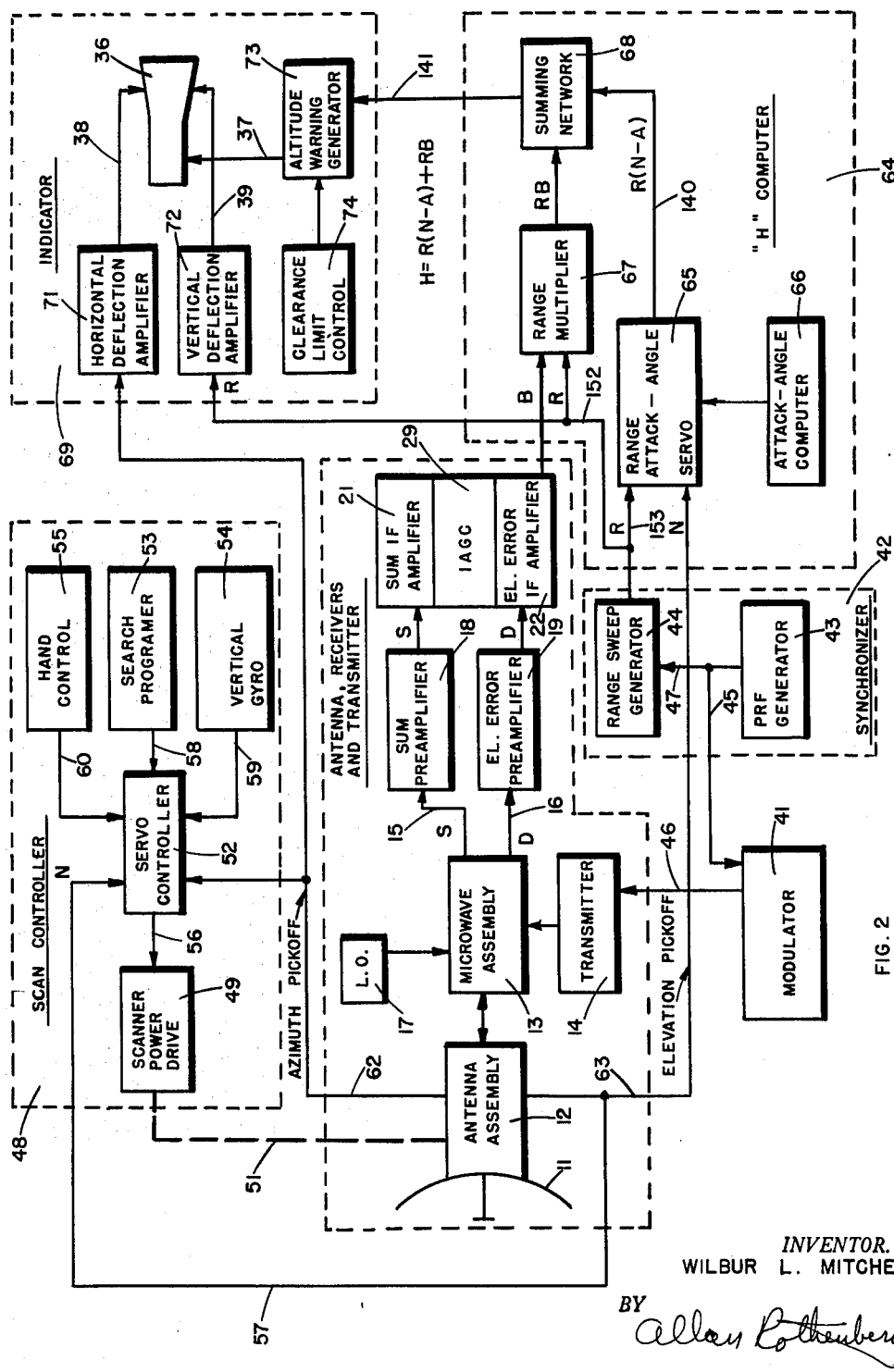
FIG. 2 is a block diagram of the system.
Figure 3:
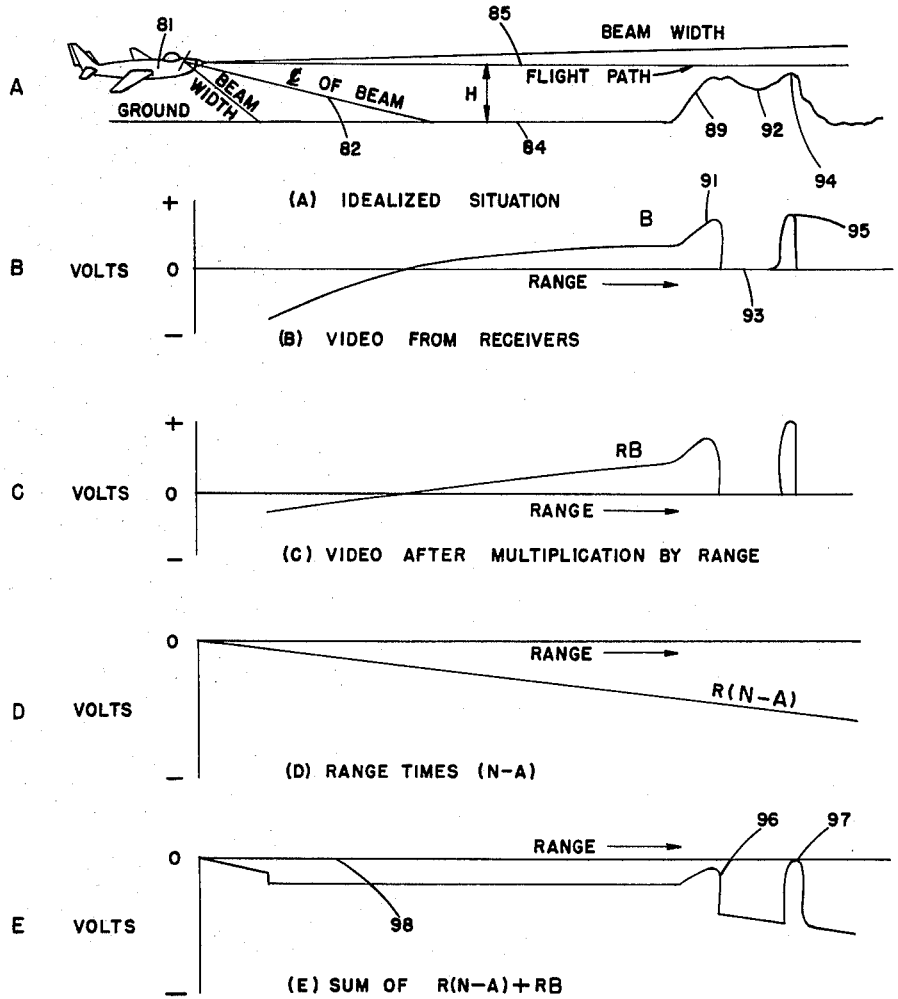
Figure 4:
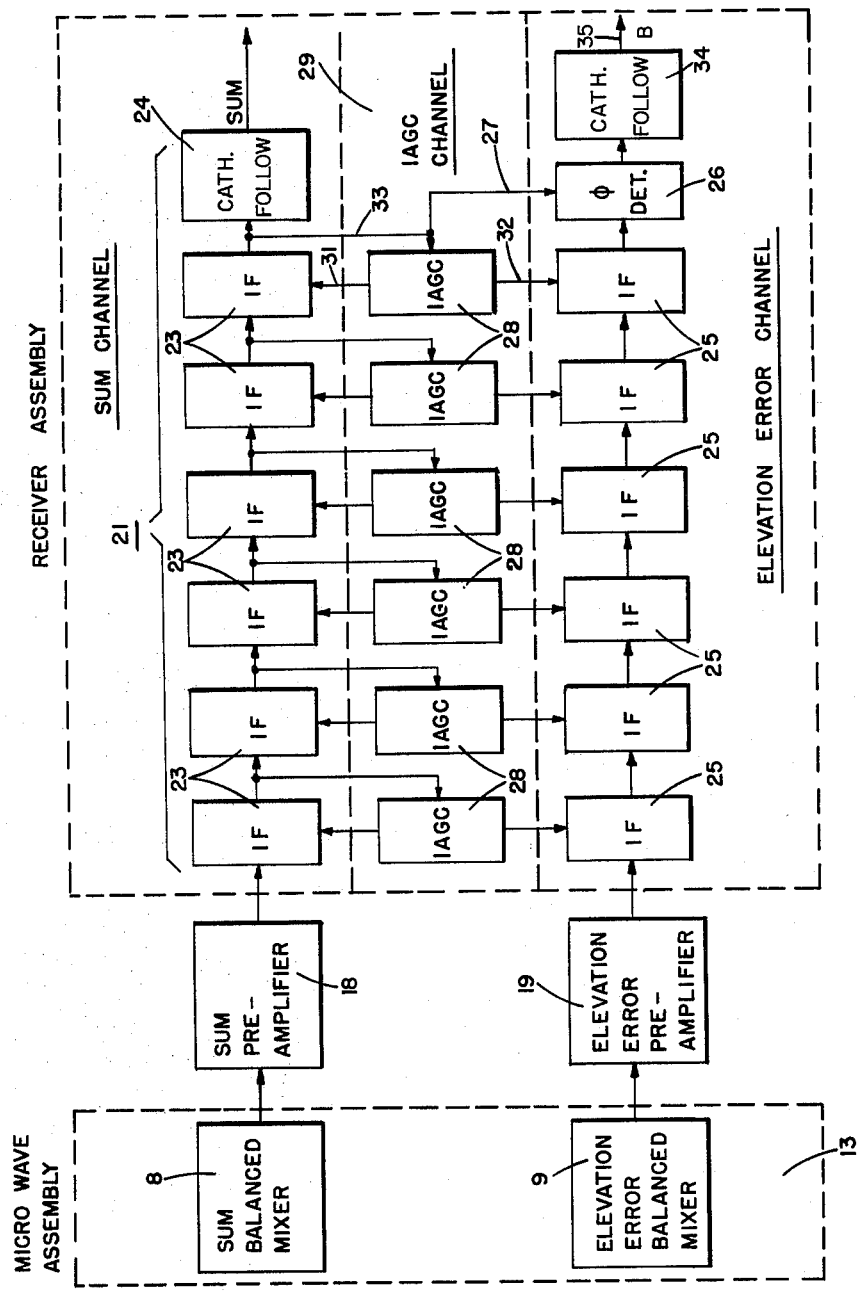
Figure 5:
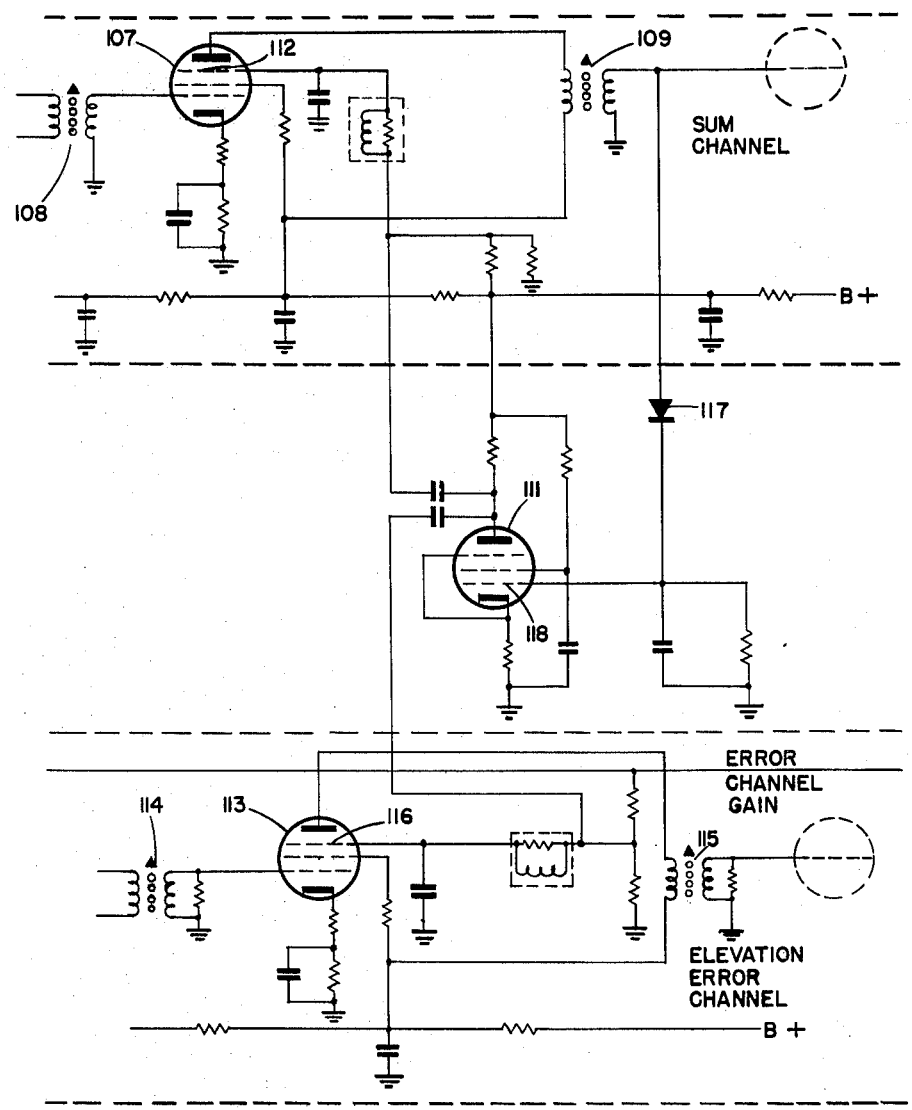
Figure 7:
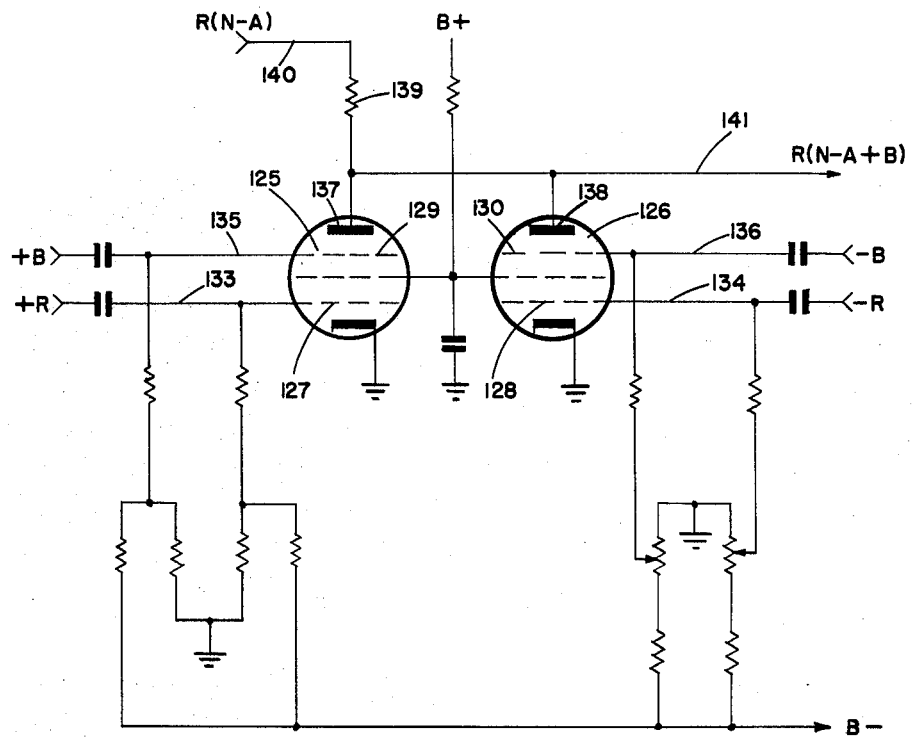
Figure 6:
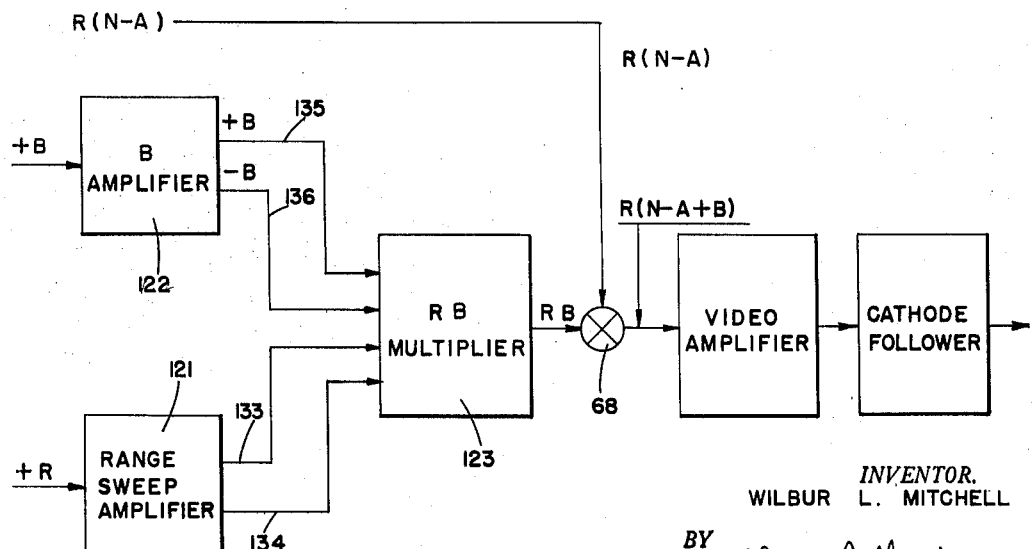
Figure 11:
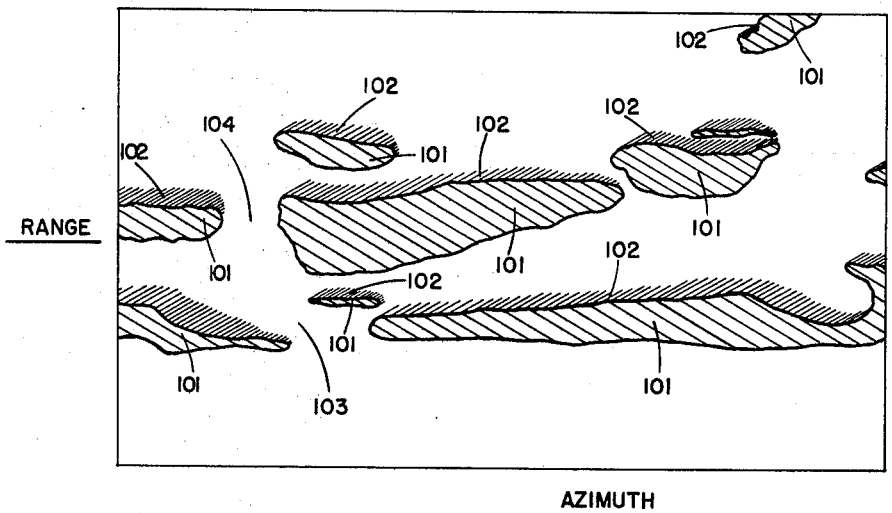
Figure 8:
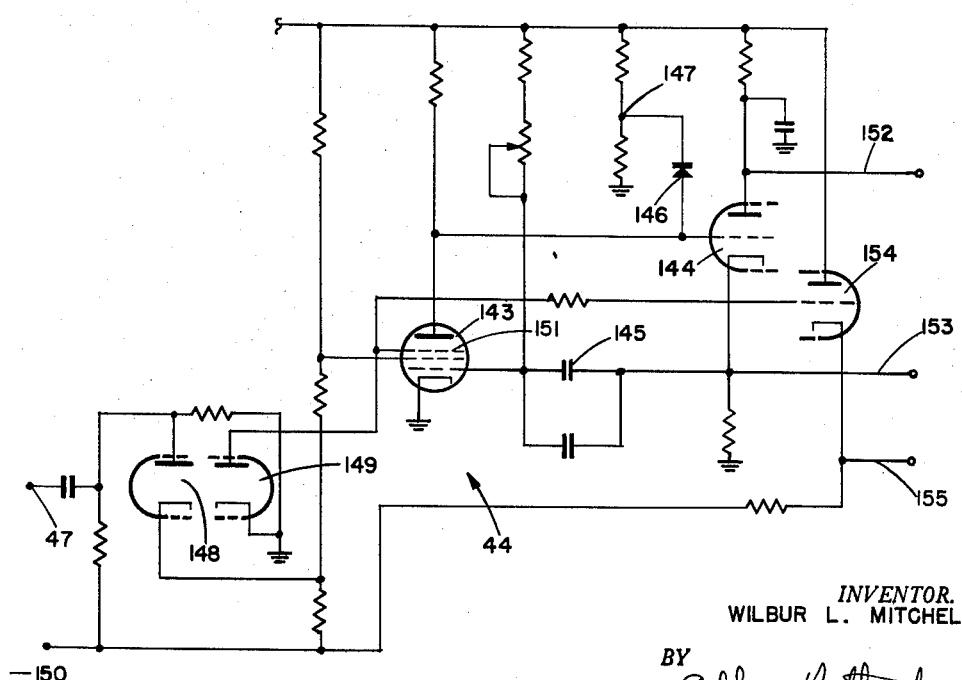
Figure 9:
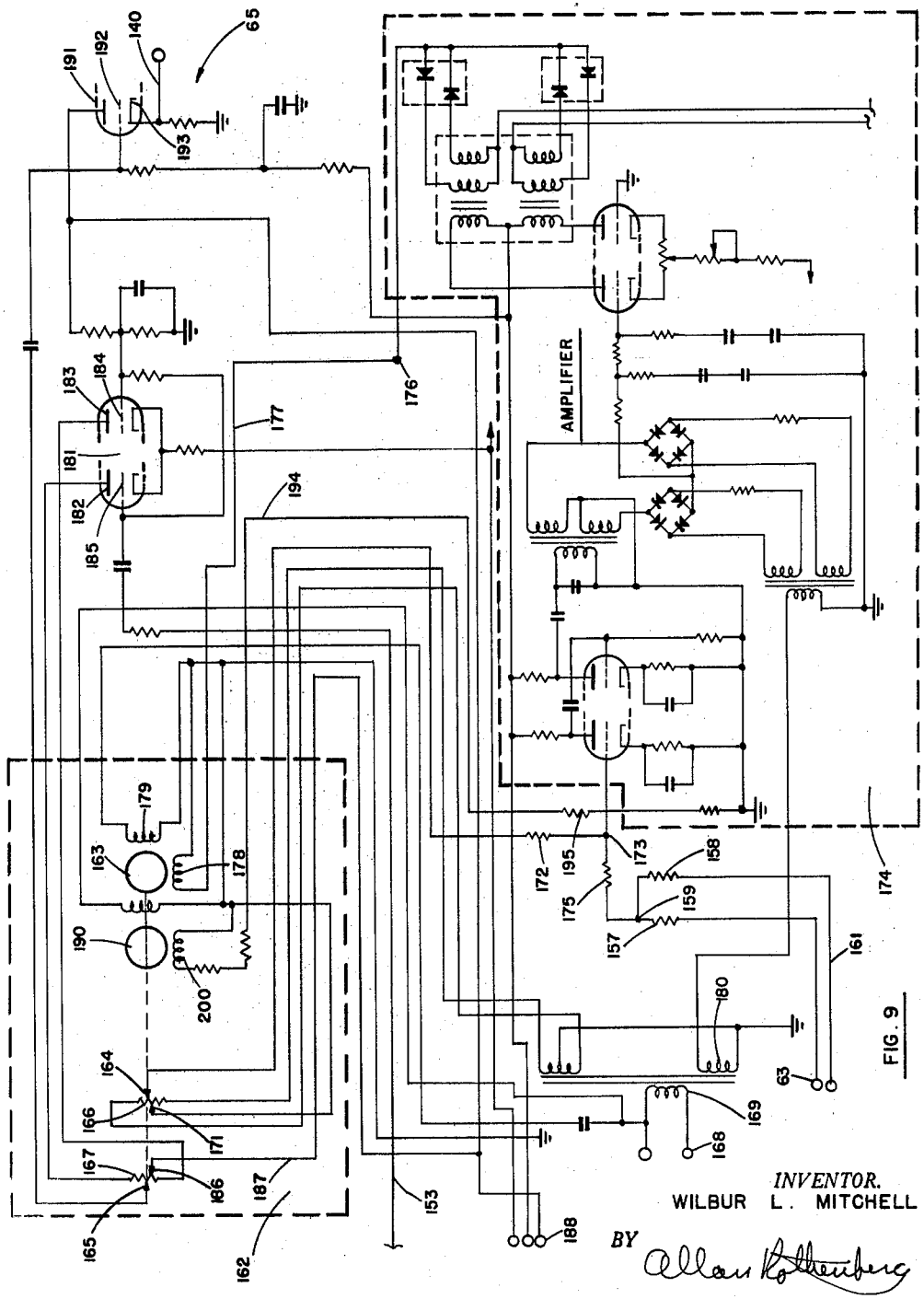
Figure 10:
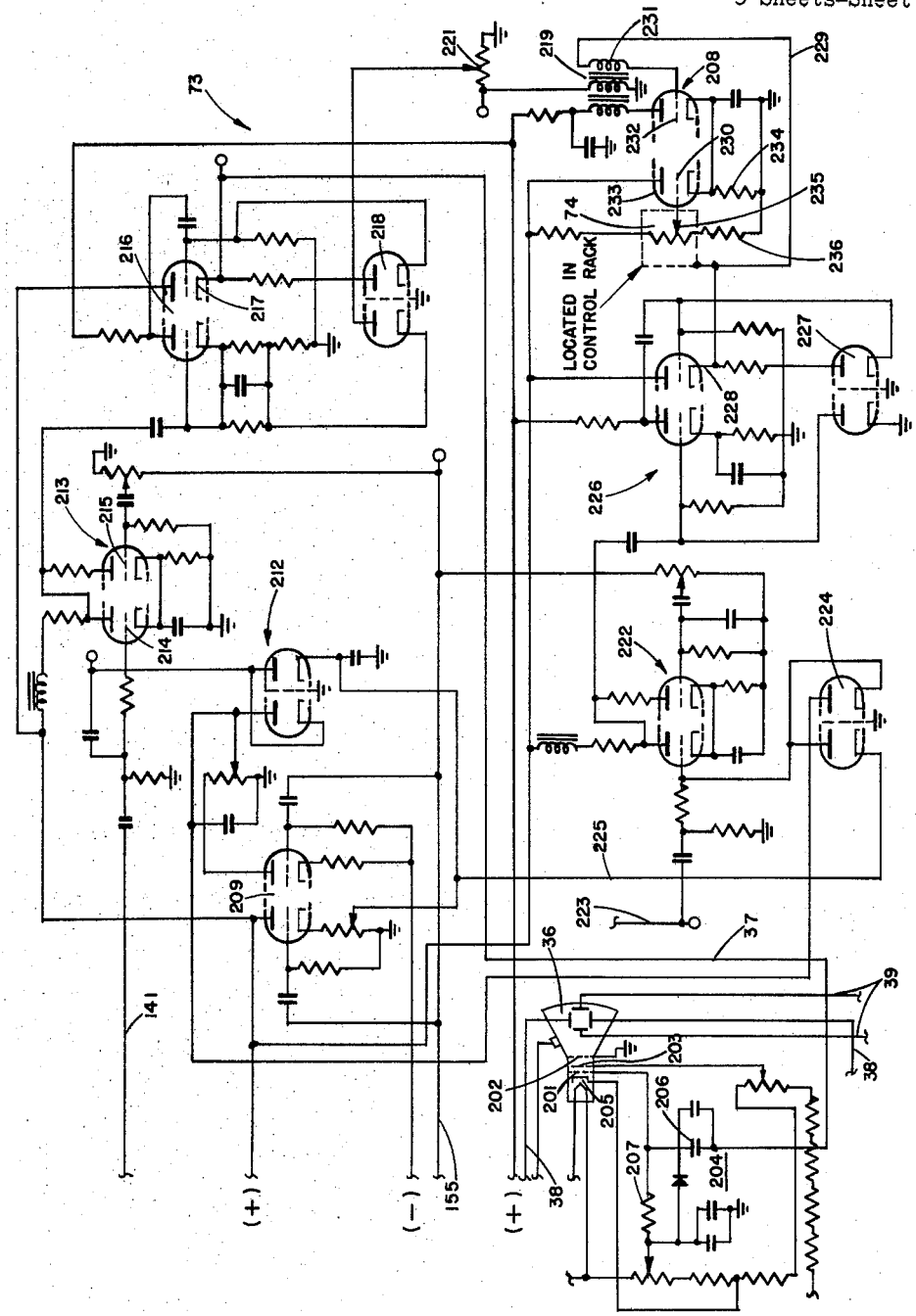

FIG. 3 is a series of curves illustrating the principle of operation in which FIG. 3A depicts the ground level in relation to points ahead of the aircraft, FIG. 3B is an idealized curve of the video output from the system of FIG. 2 corresponding to successive points along the ground in advance of an aircraft, FIG. 3C is a curve corresponding to FIG. 3B illustrating the effect of introducing the range factor, FIG. 3D is a curve representing the product of range and the difference between antenna depression and angle of attack, and FIG. 3E is a curve representing the summation of the curves of FIGS. 3C and 3D;

FIG. 4 is a block diagram of the receiver employed in the system of FIG. 2;

FIG. 5 is a circuit diagram of a typical receiver stage of the apparatus of FIGS. 2 and 4;

FIG. 6 is a block diagram of the range multiplier and summing section;

FIG. 7 is a circuit diagram of the range deviation angle multiplier and summing network of FIG. 6;

FIG. 8 is a circuit diagram of the range sweep unit employed in the system of FIG. 2;

FIG. 9 is a circuit diagram of an attack angle multiplier circuit;

FIG. 10 is a circuit diagram of an altitude warning generator and indicator;

And, FIG. 11 is a diagram illustrating a form of display which may be employed.

Like reference characters are utilized throughout the drawings to designate like parts.

It has been found that the data received by the radar system of the monopulse type in its sum channel is dependent both upon the reflective characteristics of the target and the range to the target. However, the data received by such a radar system in the elevation difference channel is dependent not only upon the above parameters, but also is dependent upon the location of the target relative to the center of the beam in elevation. This characteristic may be employed for determination of the angle at which a ground obstruction occurs in relation to the flight path or to the normal boresight of the monopulse antenna.

However, it is necessary to compensate the error or elevation difference signal strength for variations in the other parameters. In accordance with the invention, the data in the sum channel is utilized to control the gain in the elevation difference channel. This control is effected in such a manner that the signal in the elevation difference channel is dependent primarily upon the elevation angle of the target area relative to the center of the beam.

This difference signal is used to convey a warning to a pilot of a dangerous obstruction in the terrain ahead. The invention is not limited to a particular means of display. However, a suitable display results by presenting location in azimuth and range of any ground elevations or obstructions failing to provide a predetermined clearance.

Depending upon whether it is intended primarily to warn the pilot of the clearance between his flight path and ground obstructions or to plot contours of ground terrain, the difference signal representing angle between antenna boresight and a ground obstruction is corrected for depression angle of the antenna with respect either to flight path or to horizontal.

In an illustrative embodiment of the invention shown in FIGS. 2 and 4 of the drawings, the radar system is represented with the transmitting portion indicated schematically and the elements of a suitable type of receiving system illustrated in block diagram form. The profiloscope or terrain profile indicating system described in this application may be utilized in conjunction with the normal receiving system of a radar equipment for target location and tracking. However, for simplicity in FIGS. 2 and 4, only those receiver elements are illustrated which pertain specifically to the terrain indication system to which this application primarily relates. The illustrated mechanization computes the distance H between the vehicle borne radar and a reference plane such as, for example, a horizontal plane (for contour information) or a plane parallel to the flight path (for terrain clearance) in accordance with the relation $$H = R(N-A) + RB$$

where

R is instantaneous slant range to point under observation.
N is angle between boresight and centerline of aircraft.
A is aircraft angle of attack.

and

B is receiver error output representing the angle between antenna boresight and a given point on the ground.

There is an antenna 11 of the conventional paraboloid type with an antenna assembly 12 for physically positioning the antenna and a microwave assembly 13 with suitable feed elements, bridge and duplexers such as those illustrated, for example, in the monopulse system described in the copending application of Robert M. Ashby, Serial No. 216,145, filed March 17, 1951, for coupling the antenna 11 to a transmitter 14 and to sum and error channels 15 and 16, respectively, of monopulse receiver equipment of the type described in the foregoing application of Robert M. Ashby.

For conversion of the energy in the sum and error channels 15 and 16 to intermediate frequency signals, mixers 8 and 9 with a common local oscillator 17 are employed.

Preamplifiers 18 and 19 are provided in the intermediate frequency sum and error channels 15 and 16, respectively, and a plurality of additional stages of amplification represented by blocks 21 and 22 are employed with separate gain control feedback loops. For example, as illustrated in FIG. 4, in the sum channel there are six stages 23 interposed between the sum preamplifier 18 and a cathode follower unit 24. Likewise, in the error channel there are six stages 25 interposed between the error preamplifier 19 and a detector 26. The error detector 26 is a phase detector having a reference voltage channel 27 from the output of the sum amplifiers 23.

Suitable means are provided for maintaining the output of the intermediate frequency channels 21 and 22 independent of range as the distance signals are reflected from successive points on the surface of the ground or from ground obstructions, and independent of target size or characteristics. To compensate for range, sensitivity time control may, if desired, be employed as described by Van Voorhis; 23 Radiation Laboratory Series, pp. 251–252, 374–377, Sec. 9.5 and 14.14.

However, for complete compensation, it has been found preferable to employ instantaneous automatic gain control.

Separate instantaneous automatic gain control units 28 are provided in an IAGC channel 29. Each of a pair of corresponding receiver stages 23 and 25 in the sum and error channels 21 and 22 has a bias control or gain control element connected by lines 31 and 32 to a common automatic gain control unit 28 for gain tracking.

The individual instantaneous gain control unit 28, however, is caused to control gain in response to variations in sum signal strength of each stage by separate input connections 33 from the output of each corresponding sum- channel intermediate-frequency amplifier stage 23. The bias generating and coupling circuits are adjusted for proper gain tracking.

If desired, instantaneous automatic gain control circuits may be employed of the type described by Louis N. Ridenour: 1 Radiation Laboratory Series 459, Sec. 12.8 (FIG. 12.5), and 23 Radiation Laboratory Series, pp. 248–251, 369–371, Sec. 9.4 and 14.11.

The phase detector 26 operates from the intermediate-frequency sum-channel signal which is used as a reference signal and the error-channel intermediate-frequency signal to produce a video output voltage having a polarity depending upon the direction of displacement of the target from the antenna axis and an amplitude proportional to its angular displacement from the antenna axis.

It will be understood that the phase relationship required in the phase detector is established in the intermediate-frequency amplifiers. A cathode follower 34 is preferably interposed between the output of the phase detector 26 and an elevation error video channel 35.

For presenting in a suitable display the signals obtained from the profiloscope receiver illustrated in FIG. 4, a cathode ray tube 36 is provided, having beam intensification and deflection circuits, represented diagrammatically in FIG. 2 by lines 37, 38 and 39, respectively.

As in conventional search and track radar systems, a modulator 41 is provided for causing the transmitter 14 to emit pulses of microwave energy. For synchronization of the transmitted pulses with the indications received by the cathode ray tube 36, a synchronizer assembly 42 is provided including a pulse repetition frequency generator 43 and a range sweep generator 44. As shown, the generator 43 has an output 45 to the modulator 41 which in turn has an output represented by a line 46 to the transmitter 14. The pulse generator 43 likewise has an output 47 to the range sweep generator 44.

The pulse frequency generator 43 may take the form, for example, of a free-running blocking oscillator furnishing synchronizing trigger pulses to the modulator 41 through line 45 and to the range sweep generator 44 through line 47.

A scan controller 48 is provided for controlling the mechanical movement and positioning of the antenna 11. The scan controller 48 includes conventional elements such as a scanner power drive 49 having a mechanical connection represented by a dash line 51 to the antenna assembly 12, a servo controller 52, a search programmer 53, and a vertical gyro 54. There may also be a hand control 55 if desired.

As in conventional scan controllers, the servo controller 52 has an output line 56 to the scanner power drive 49 with inputs from an elevation pickoff line 57 and from the elements 53, 54, 55 through lines 58, 59 and 60 respectively.

The antenna assembly 12 includes suitable mechanism for producing voltages proportional to deflection in azimuth and elevation of the antenna 11 from a reference point and such voltages are supplied to cables represented diagrammatically by lines 62 and 63, line 57 being a branch of line 63.

In accordance with the invention, an altitude computer or "H" computer 64 is provided comprising a range attack-angle servo 65, and attack angle computer 66, a range multiplier 67 and a summing network 68.

The attack angle computer 66 is not a part of the present invention. A suitable type of attack angle computer which may be employed is described in the copending application of Frederick H. Gardner, Serial No. 506,974, filed May 9, 1955, now Patent Number 3,077,773, and assigned to the same assignee as the present application.

Angle of attack indicators are also described in the NACA Report, RM-A52A04, "Flight Calibration of Angle of Attack and Side Slip Detectors on the Fuselage of a 35° Swept-Wing Fighter Airplane."

The range attack angle servo 65 may be a conventional type low speed motor-driven servo and the summing network 68 may be conventional. In order to handle the output of the elevation error intermediate frequency amplifier, the range multiplier 67 is preferably of the electronic type, capable of operating at the frequency of the input signals. The internal circuits will be described more in detail hereinafter.

There is an indicator assembly 69 including the cathode ray tube 36, a conventional horizontal deflection amplifier 71, a conventional vertical deflection amplifier 72 and a beam intensity voltage source 73 constituting an altitude warning generator having an adjustment control for selecting the minimum clearance below which warning signals are to be produced. Such clearance limit control is designated by box 74.

FIG. 3 represents an idealized situation with FIG. 3A corresponding to FIG. 1. FIG. 3B is a graph representing a curve of error signal output or B plotted in a vertical direction against range or elapsed time plotted in a horizontal direction.

The error video signal B is multiplied by range R in the range multiplier 67. At the same time that the modulator 41 is triggered, the range-sweep unit 44 is also triggered. The saw-toothed signals or range-sweeps from the range sweep generator 44 are applied to the range-sweep multiplier 67 and modulate the error video B so that, with zero range sweep and any amount of error video, the output of the range multiplier is zero. At any other time, the output is the product of B and the instantaneous range voltage as illustrated in FIG. 3C.

The other product in the equation, $R(N-A)$ is obtained by standard electromechanical means. The antenna elevation angle N, represented by a 400 c.p.s. signal, is taken from the elevation pickoff on the antenna and is resistively summed with the attack angle of the aircraft, A, also represented by a 400 c.p.s. signal. The algebraic sum of the two angles, $N-A$, is fed to a conventional servo loop 65 which positions the brush arm of a potentiometer. Push-pull range sweep voltages are applied to this potentiometer so that the brush arm picks off a voltage proportional to $R(N-A)$ as illustrated in FIG. 3D.

The two products, RB and $R(N-A)$ are then summed and amplified. The resultant H, as illustrated in FIG. 3E, is the perpendicular distance from the flight path 85 to the point 87 on the ground.

As H decreases, the danger of collision with the terrain increases. Therefore, an altitude warning must be presented to the pilot when H becomes less than a preselected safe minimum.

In order to provide terrain clearance information in a monopulse type of radar system, monopulse error signals are produced which are accurate measures of the angles between the points at which the beam strikes the ground and the center line of the beam. Any change in signal strength in the error channel because of range to the target and intensity of the reflection is eliminated in order to produce a sufficiently accurate monopulse error signal.

The basic problem for any terrain clearance device is that of determining and displaying range, azimuth and the perpendicular distance from the flight path of the aircraft to points on the earth's surface. Range and azimuth are obtainable from any search radar and the profiloscope provides the height information in the frame of reference of a conventional (PPI) search radar. To obtain this, use is made of conventional pickoffs on the antenna to determine the elevation angle of the beam center line without scanning in elevation by movement of the antenna and the elevation error channel of a monopulse radar is used to determine and provide the angular deviation of points on the ground which are not on the beam center line. This information, along with the angle of attack, is used to compute the perpendicular distance from the flight path of an aircraft to a point on the earth's surface.

The perpendicular distance, H, from the aircraft flight path to the ground at any point is found by $$H = R \sin(N - A + B)$$

where

R is instantaneous slant range to point under observation

N is angle between boresight and centerline of aircraft

A is aircraft angle of attack and

B is receiver error output representing the angle between antenna boresight and a given point on the ground.

The terrain clearance warning device or profiloscope is required to operate only when the aircraft is very close to the terrain under observation, a condition which limits all of the above angles to very small values.

The apparatus is responsive to reflections along successive lines R from the earth's surface, the line R representing the slant range of the reflections, becoming longer with the passage of time. Since the velocity of the reflections is constant, the passage of time for reception of reflections is proportional to the slant range.

Since the sine of a small angle is approximately equal to the angle in radians, the equation can be simplified to $$H = R(N - A + B)$$

or $$H = R(N-A) + RB$$

which is the equation solved by the profiloscope.

The first consideration in solving the equation, $$H = R(N-A) + RB$$

is the determination of the angle B. As previously stated, the profiloscope used a monopulse radar to obtain this factor. The radar reflection from the ground is separated in the microwave section of the antenna into its components of range, azimuth error, and elevation error, which are available simultaneously at radio frequency. The profiloscope uses only the sum and elevation channels of the monopulse radar for the determination of B.

The elevation error signal provides a measure of the angular deviation of the received signal from the centerline of the beam. The strength of the error signal is partly indicative of the deviation of reflections from the center line of the beam, but the strength is also affected by range to the point in question and the radar cross section at this particular point on the surface of the earth.

In the vicinity of the axis of the radar antenna, the sum signal S and the elevation error signal D are related by $$D = SB \qquad (1)$$

Since the sum signal is a function of slant range and effective radar cross sections, it will exhibit extensive amplitude modulation. Because of the nature of the monopulse beam pattern, the elevation error signal also will exhibit amplitude modulation, which is directly related to the modulation on the sum signal. This modulation exists in addition to the desired elevation error information. The output of the sum channel is kept nearly constant because the instantaneous automatic gain control 29 (IAGC) is derived from the sum signal in each stage of the sum channel 21 of the receiver. This same control voltage is used to control the instantaneous gain of the error channel so that the instantaneous gain of the error channel 22 is substantially equal to that of the sum channel 21. Thus, $$S_o = G \times S = K \qquad (2)$$
$$D_o = G \times D \qquad (3)$$

where G is the instantaneous gain of the sum and error channels. $S_o$ is the output of the sum channel, $D_o$ is the output of the elevation error channel.

Therefore, combining Equations 1 and 3, $$D_o = GBS \quad (4)$$

Combining Equations 4 and 2

$$D_o = KB \quad (5)$$

thus, the error output signal is proportionate only to B.

Practically, gain control cannot be made absolutely instantaneous but requires some finite time to operate. Sharp discontinuites in terrain would therefore cause an appreciable variation in the sum output signal with a consequent incorrect error output. However, a time lag in the gain control circuits of approximately 0.5 microsecond has been achieved. Moreover, the resultant 0.5 microsecond spikes in the output may be substantially reduced by bandwidth limiting in the video amplifier. Therefore, for all practical purposes, the output of the error channel 22 is B.

The solution of the equation $$H = R \times (N - A) + RB$$

is shown in block diagram in FIG. 2.

The modulator 41 controlled by the pulse repetition generator 43, fires the transmitter 14 and a radio frequency pulse is radiated from the antenna. After striking the ground and returning, the energy is picked up by the antenna and channeled into the microwave system. The energy is separated into elevation error and range information in balanced mixers 8 and 9 of FIG. 4, mixed with the output from the local oscillator 17 and converted into intermediate frequency. The I-F signals are fed into their respective channels 21 and 22 in the receiver, the elevation error or difference channel, and the sum or range channel.

In the receiver, the signals are amplified and detected, emerging as video signals. The video error signal from the line 35, as shown in FIG. 4, is phase detected, utilizing the sum signal as the reference by reason of the reference voltage input through the line 27 from the sum channel 21. Such phase detection gives the error video signal the proper polarity to indicate whether the returned signal is from a point above or below the beam centerline.

The dimensions required for a profiloscope or terrain clearance device are range, azimuth and elevation of points on the surface of the earth. The range and azimuth may be obtained from the monopulse or any other type of search radar. The elevation angle is obtained in the apparatus described in the present application without scanning in elevation by movement of the antenna, but instead by utilizing the relationship between magnitude of the sum and error signals of a monopulse type of radar to detect deviations of points on the surface of the earth from the center line of the monopulse beam.

For illustrating the geometry of the aircraft altitude computation, the angles shown in FIG. 1 have been considerably exaggerated. The antenna 11 is mounted upon an aircraft 81 so that the boresight or center line 82 of the radar beam 83 makes a small angle with the ground 84 and with the flight path 85. Since the electromagnetic energy in the radar beam travels at a constant speed, different portions of the beam 83 strike successive portions of the ground 84 at successive periods of time and reflections are received at succesively later instants of time. Such time delay provides a measure of the range R.

Reflections are received along a line 86 from the point 87 which is a distance H below the flight path 85, which is assumed to be horizontal. In the apparatus described, the scan controller 48 is so controlled by the gyro 54 in a conventional manner to maintain a fixed depression angle of the boresight 82 with respect to the center line 88 of the aircraft 81. The scan controller is also controlled, as by the search programmer 53 for example, to effect any desired azimuth positioning or scanning of the antenna. Whenever it is desired to provide contour information rather than a clearance warning signal, the scan control 48 may also be arranged in a manner to those skilled in the art to maintain a fixed depression angle of the boresight 82 with respect to horizontal since the flight path 85 may not necessarily be horizontal.

The angle of reflected beam 86 from the point 87 to the center line 82 of the radar beam 83 is represented by B. The actual depression angle of the antenna with respect to the center line 88 of the aircraft is represented by N and the angle of attack or the angle between the actual line of flight 85 and the center axis 88 of the aircraft is represented by the symbol A.

As shown in FIG. 3, when the radar beam strikes an obstruction or elevation on the ground such as the brow of hill 89, the positive angle of the reflection with the center line 82 of the radar beam increases rapidly for slight increases in range so that the curve of FIG. 3B representing video output of the receiver in the error channel rises along a steeper slope at the portion 91. However, if the hill or range of hills in front of the aircraft 81 should have a depression or saddle back 92, the radar system could not "see" this portion of the obstruction and the video output would fall abruptly to zero, as shown in 93 in FIG. 3B. A more distant elevation 94, however, would be revealed by a sharp increase in video output as shown at 95 in the curve of FIG. 3B.

FIG. 3C illustrates the result of multiplying the video output by range or the output of the range angle multiplier 67; FIG. 3D illustrates the voltage output of the range attack angle servo 65; FIG. 3E is the algebraic summation of the curves of FIGS. 3C and 3D. The output of the summing network 68, shown in FIG. 3E, is a curve having negative values throughout, assuming adequate terrain clearance, with maxima at points 96 and 97 corresponding to peak elevations in FIG. 3A and maxima in the curves in FIGS. 3B and 3C. As shown in FIG. 3A, the flight path 85 of the aircraft 81 provides a slight clearance. If for safety, a greater terrain clearance is desired, electrical means such as the clearance limit control 74 of FIG. 2 is set for, in effect, lowering the zero line 98 of FIG. 3E so that a projection as high as 97 will protrude above the data line above 98 and produce a positive signal for giving an altitude warning indication.

Any desired type of presentation of the warning information may be employed. If it is desired to give numerical readings of the elevations of points along the ground surface 84, as in contouring, a cathode ray tube may be arranged for suitable inputs for plotting altitude of ground points with respect to range or azimuth as desired. However, for use of a pilot as a safety device where it is necessary to obtain warning information quickly, not only as to presence of danger, but as to the location of points of ground elevation in range and azimuth providing adequate clearance, it is preferable to utilize a presentation in which range and azimuth are coordinates and a signal is produced upon the screen of the cathode ray tube at coordinates corresponding to excessive ground elevation, i.e., inadequate clearance.

This may be done, for example, by means of a sector of a plan position indication type of display with azimuth and range signals supplied to deflection circuits 38 and 39 of the cathode ray tube 36 and the altitude warning generator 73 arranged to supply a beam intensifying voltage at the connection 37 whenever a point on the curve of the FIG. 3E such as a point 97 rises above a predetermined value corresponding to the predetermined clearance considered safe. For example, altitude warning information may be obtained from a blocking oscillator which is caused to run free whenever the clearance altitude H decreases below a safe minimum and to generate voltage for intensifying portions of the display. In this manner, an artificial video (BO pulses) is presented, the intensity of which can be turned up giving the 3-dimensional appearance of a shadow behind each obstacle such as illustrated in FIG. 11. In FIG.

11, the areas 101 represent areas located in range and azimuth for which the peak value of the curve of FIG. 3E exceeds a predetermined set value. The dark areas 102 represent synthetic video to give a 3-dimensional appearance. This type of presentation provides the pilot with information as to the presence of obstacles but not as to the exact height of obstacles. Nevertheless, the pilot is provided with information that flying is safe along a course in spaces 103 and 104 between obstacles. If it is desired to indicate the altitude of obstacles numerically, this may be accomplished by other types of display.

The basic profiloscope data obtained from the receivers as described may be presented or displayed in various ways.

Since the data for presentation are 3-dimensional in character, color may be employed as a third dimension, using cathode ray tubes. Using black and white cathode ray tubes, two dimensional samples may be displayed successively or on various portions of the screen.

For example, a display may be used in which range and elevation angles are the two dimensions displayed and the display is given for a selected azimuth, normally zero ° azimuth or dead ahead, other azimuth anbles being obtained momentarily by switching. If a three-color cathode ray tube is employed, the pilot may be given an indication of obstructions both ahead and on either side of his flight path by energizing the beams to activate the three different colors of phosphors in accord with data at 0 ° azimuth and azimuths on either side; for example, 30° left and 30° right.

Another way of providing the pilot with 3-dimensional information by plotting range against elevation is illustrated by a display where range-elevation plots for different azimuth angles are produced on different portions of the cathode ray tube in quick succession as by time sharing to form azimuth contours, relying on the retention of illumination effect of the phosphor.

A range contour presentation may be provided if curves of elevation plotted against azimuth are produced successively by applying the error channel output to the vertical deflection plates of the cathode ray tube and azimuth voltage to the horizontal deflection plates with the beam blanked out during flyback in intermediate intervals so that the successive curves produced at successive predetermined times represent successively different ranges.

As illustrated in FIG. 4, the receiver consists of six stages each on the sum and error sides, and the feedback loop is closed around each stage in the sum amplifier to provide IAGC. The control voltage applied to each stage in the sum amplifier is also applied through suitable decoupling networks to the corresponding stage of the error amplifier. This, together with suitable bias adjustments, causes error channel gain to be equal to the gain of the sum amplifier.

A typical receiver stage is illustrated in FIG. 5. As shown, there is a pentode 107 in the sum channel with an input from an interstage coupling transformer 108 and an output in the anode circuit through another interstage transformer 109 to the next stage. For control of gain, there is an IAGC unit comprising a pentode 111, having an output coupled capacitatively to the suppressor grid 112 of the sum channel amplifier tube 107. In the error channel there is likewise a pentode 113 with interstage input and output coupling transformers 114 and 115 and having a suppressor grid 116 also capacitatively coupled to the output of the IAGC pentode 111 for gain control. The circuit components are so selected and the apparatus is so assembled and adjusted as to provide a matching arrangement with gain of the tubes 107 and 113 equally controlled.

The feedback loop for gain control comprises a diode 117 connected on the output side of the output transformer 109 in the sum channel for supplying voltage to the number 1 grid 118 of the gain control pentode 111. As the output of the stage 107 and the potential of the control grid 118 increase, the anode potential of the control tube 111 falls. This reduces simultaneously the potential of the suppressor grids 112 and 116 so as to decrease the gain and avoid saturation of the tubes 107 and 113 regardless of the introduction of wide signal variations resulting from differences in range and target size and types of terrain.

The elements of the range multiplier 67 and summing network 68 of FIG. 2 are shown in greater detail in block form in FIG. 6. There is a range sweep amplifier 121 comprising a one-tube paraphase amplifier used to convert the single-ended range sweep to a push-pull signal. There is also an angle B amplifier 122 consisting of a differential amplifier with common cathodes and one grid grounded. It provides amplified push-pull video from a single-ended input. The outputs of the amplifiers 121 and 122 are supplied to a multiplier 123. For explanation, a summing device 68 is shown separately in FIGS. 2 and 6.

However, as shown in FIG. 7, the RB and $R(N-A)$ computing networks are combined into a single stage comprising a pair of pentodes 125 and 126 having number 1 grids 127 and 128 and suppressor grids 129 and 130 respectively. The opposite polarity outputs of the amplifier 122 are applied to the suppressor grids 129 and 130, and the outputs of the range amplifier 121 are applied to the number 1 grids 127 and 128 by input lines 135, 136, 133 and 134 respectively. The push-pull range sweep applied to the control grids or number 1 grids of the multiplier tubes varies their $g_m$ by equal amounts in opposite directions for signals applied to the suppressor grids. Therefore, when the circuits are properly balanced, the B component at the multiplier output is proportional to range.

To accomplish summing, the anodes 137 and 138 of the multiplier tubes 125 and 126 are not connected to the usual constant voltage plate supply but to the direct-current output of the range angle servo 65 supplying a voltage representing the quantity $R(N-A)$. There is a common load resistor 139 in the anode circuits of the multiplier tubes 125 and 126 which constitutes the summing resistor serving as the summing network 68. The output line 140 of the range attack angle servo 65 serves as a supply voltage line for the multiplier tubes 125 and 126. Line 141 serves as the input to the altitude warning generator 73 of FIG. 2.

The range sweep generator 44 may take one of many forms of suitable wave generators proven in the art for producing both rectangular wave and saw tooth wave, synchronized with the generator 43. For example, a screen-coupled phantastron may be employed having two outputs, a push-pull saw-toothed signal whose slope corcesponds to the rate of increase of range with respect to time and a rectangular wave whose width is the maximum range of the profiloscope.

As illustrated in FIG. 8, the range sweep unit 44 comprises a phantastron type of circuit including a pentode 143 with a feedback coupling from the anode to the control grid by a cathode follower triode 144 and a discharge condenser unit 145 with a switching diode 146 connected between a voltage divider 147 and an input to the triode 144 for setting the discharge level of the condenser unit 145. For triggering the tube 143, a trigger impulse from the pulse repetition frequency generator 43 is applied through the input line 47 and clipping diodes 148 and 149 to the suppressor grid 151 of the tube 143. The triangular wave range signal is supplied from the anode of the triode 144 by a line 152 to the range multiplier 67 and the vertical deflector amplifier 72. A range sweep may also be taken over line 153 from the cathode of the triode cathode follower 144 for supplying the range attack angle servo 65. A range gate square wave as utilized in the search phases in the radar system with which the profiloscope may be employed may be obtained from a cathode follower triode 154 coupled to the suppressor grid 151 of the tube 143 and having a cathode output line 155.

The internal connections of the range attack angle multiplying servo are shown in FIG. 9. There is a resistance network comprising resistors 157 and 158, having a junction terminal 159 at which voltage is representing attack angle and antenna depression with respect to the center line of the aircraft are differentially applied. The resistor 157 is connected through line 63 to the elevation pickoff of the antenna assembly 12 to receive a voltage proportional to the antenna angle. The resistor 158 is connented through a line 161 to the output of the attack angle computer 66 so that a voltage appears upon the junction terminal 159 representing the angle between the boresight 86 of the antenna 11 and the flight path 85 or the quantity $N-A$.

For producing a voltage representing a product of this voltage and a voltage proportional to range, a servo 162 in the form of a motor-driven self-balancing potentiometer is provided. It is arranged for producing a voltage to balance that appearing upon the junction terminal 159 and for adjusting the tap on a second potentiometer in accordance therewith. The second potentiometer has a voltage applied thereto in proportion to the value of range.

As illustrated in FIG. 9, the servo 162 includes a two-phase motor 163 driving movable taps 164 and 165 of electrically independent potentiometer resistors 166 and 167. The potentiometer resistor 166 is connected across a 400-cycle alternating current source 168 through a transformer 169. The potentiometer 166 is also provided with an adjustable intermediate tap 171, the adjustment serving for calibration. The movable motor-driven tap 164 is connected through a resistor 172 to an input terminal 173 of an amplifier 174 to which the junction terminal 159 is differentially connected through a resistor 175. Thus, in the event of unbalance between the voltages applied to the resistors 172 and 175 a voltage input is applied to the amplifier 174. The latter has an output terminal 176 connected through a conductor 177 to one phase winding 178 of the motor 163, the other side of the winding 178 being grounded. The motor 163 is also provided with a second phase winding 179 connected to the 400-cycle source 168 so that it runs in one direction or the other depending upon the phase of the input voltage to the amplifier 174 which is a phase-sensitive amplifier, deriving reference voltage from a transformer winding 180.

For applying a voltage to the potentiometer resistor 167, proportional to range, a push-pull amplifier 181 is provided having anodes 182 and 183 connected across the resistor 167 with one control grid 184 biased to a fixed potential and the other control grid 185 capacitively coupled to the line 153 from the range sweep generator 44. The potentiometer resistor 167 has a center tap 186 connected through a conductor 187 to a positive power supply terminal 188.

Accordingly, the motor 163 comes to rest when the tap 164 is in such a position as to apply a voltage equal and opposite in phase to that appearing on the junction terminal 159 representing antenna depression angle adjusted for attack angle. Consequently, the setting of the adjustable potentiometer tap 165 supplies a potentiometer voltage representing the difference between antenna depression angle and aircraft attack angle. Since the voltage applied to potentiometer 167 is proportional to range, the voltage appearing on tap 165 represents the product of range and the difference between antenna depression angle and aircraft attack angle. For amplifying the signal appearing upon the potentiometer movable tap 165, a cathode follower 191 is provided having a control grid 192 coupled to the potentiometer movable tap 165 and having a cathode 193 connected to the line 140 shown in FIG. 2.

In order to avoid hunting or overshoot, a conventional tachometer generator 190 is provided which supplies an anticipating voltage proportional to rate of change of the motor output through an output winding 200 and a conductor 194 in series with a resistor 195 to the input terminal 173 of the amplifier 174.

The internal connections of the altitude warning generator 73 and control 74 are illustrated in the circuit diagram of FIG. 10. The cathode ray tube 36 is provided with a conventional high-voltage power supply (not shown) and sweep plates with conductors 38 and 39 for connection to the horizontal and vertical amplifiers 71 and 72. Number 1 and number 3 grids 202 and 202 respectively have conventional connections for beam focusing. There is a number 2 grid 203 for control of beam intensity. It is provided with a conventional biasing circuit 204 for normally supplying sufficient negative bias to the grid 203 with respect to the cathode 205 for blanking out the beam of the cathode ray tube 36. However, the beam intensity control line 37 is coupled to the beam control grid 203 through a coupling condenser 206 and bias resistor 207 for elevating the potential of the grid 203 when beam intensification is to be accomplished. For generating such beam intensifying voltage, a blocking oscillator 208 is provided with electronic control circuits responsive to the input through the line 141 from the range multiplier 67 or the summing network 68 thereof shown in block form in FIG. 2.

There is a twin triode clamping gate unit 209 having an input from a line 155 at which a range gate or rectangular wave is supplied which is synchronized with the range voltage and transmitter synchronizer 42. Such a range gate is provided as previously explained by the range sweep generator 44 at an output 155 not shown in FIG. 2 but shown in FIG. 8. There is a twin diode unit 212 connected as a clamping diode gated by the unit 209 in response to the range gate at the input line 155. For amplifying the video input at the line 141, a twin triode unit 213 is provided having an input control grid 214 coupled to the video input line 141 and clamped by gated unit 212 and a gating control grid 215 fed with the range gate on line 155. The unit 213 constitutes an amplifier and pedestal mixer.

There is a twin triode unit 216 connected as a composite amplifier and cathode follower coupled to the output of the pedestal mixer unit 213. The output cathode 217 of the unit 216 supplies beam control potential to the grid 203 of the cathode ray tube 36 through the line 37.

For suppressing or decreasing the output of the amplifier-cathode follower 216 except when the video input signal of the line 141 exceeds the predetermined value of the clearance determined by the control 74, a twin diode mixer and clamp unit 218 is connected to the composite amplifier 216 and made responsive to the output of the blocking oscillator 208. The left hand element of unit 216 is cut off by a positive signal fed to its cathode through unit 218 from the output of the blocking oscillator.

The blocking oscillator 208 which is conventionally connected has a transformer output winding 219 connected through a warning signal pulse gain control potentiometer 221 to the mixer clamp unit 218.

For controlling the blocking oscillator 208, a second twin triode unit 222, connected as a pedestal mixer, is provided which has an input from a second video line 223 (coupled through an isolating stage, not shown, to the line 141) and is provided with gating means comprising a twin diode unit 224 connected as clamp diodes with an input through line 225 from the cathode output of the first stage of the clamp gate unit 209, which is controlled by the range gate at line 155. There is a second video amplifier unit 226 coupled to the output of the pedestal mixer 222 shown as a twin triode also having clamp diodes connected across the output in the form of a twin diode unit 227.

For coupling the cathode output of the amplifier 226 to the blocking oscillator 208, the cathode 228 is connected through a line 229 and the blocking oscillator transformer winding 231 to the blocking oscillator control grid 232. For controlling the cathode bias and, therefore, the output level of the amplifier 226 required to set the blocking oscillator 208 into free-running condition, a bias control triode 233 is provided having a cathode resistor 234 common to the blocking oscillator 208 and having a control grid 230 connected to a tap 235 adjustable upon a voltage divider 236. The voltage divider, with its tap 236, thus constitutes the clearance limit control 74 shown in block form in FIG. 2.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A ground clearance warning device, comprising in combination a monopulse radar having a pair of receiver channels for sum and error signals, respectively, intermediate frequency amplifier stages interposed in the sum and error channels, instantaneous gain control apparatus for both of said channels, feedback means responsive to sum amplifier stages for controlling the instantaneous gain control apparatus, phase detector means in the elevation error channel having a reference voltage input from the sum channel, a cathode ray tube having an intensification circuit, a range sweep generator, and multiplying means having an input from the range sweep generator and the elevation error phase detection means and an output to said intensification circuit.

2. A profiloscope comprising in combination with an aircraft, an antenna mounted thereon with space stabilizing means therefor for directing the antenna center line obliquely toward the ground, measuring apparatus for indicating the angles between said center line and points at which the beam strikes the ground, an angle of attack indicator on the airplane for indicating the angle between said center line and the flight path of the aircraft, and means responsive to said angles and the range of said points for indicating safety of the flight path with respect to location of the points at which the beam strikes the ground.

3. The combination with a vehicle of a monopulse system carried thereby comprising means for producing an energy beam with lobes extending on either side of a centerline which extends at a relatively small angle with respect to the path of said vehicle and having a pair of receiver channels for sum and error signals from said lobes, means for providing an angle signal representing said angle, means responsive to variations of said sum signals for compensating both said sum and error signals for variation of signal strength, means for generating range signals indicative of slant range of energy reflecting targets, and multiplying means responsive to said angle and error signals and to said range signals for indicating distance, in a direction normal to said vehicle path, between said vehicle and said energy reflecting targets.

4. In combination with a vehicle, a monopulse system carried by the vehicle and including means for producing an energy beam with lobes extending on either side of a centerline which extends at a relatively small angle with respect to the path of said vehicle, said system having a pair of receiver channels for range and error signals from said lobes, and multiplying means responsive to said range and error signals for computing in accordance with said angle the distance between said vehicle and an energy reflecting target as measured in a direction substantially normal to said vehicle path.

5. A vehicle borne monopulse radar including an antenna for transmitting a multilobe radiation pattern toward points on the ground along a centerline displaced by a relatively small angle from a predetermined reference plane, a pair of receiver channels for sum and error signals respectively representing additively and subtractively combined reflections, means for generating a signal indicative of the range of points from which said sum and error signals are reflected, and means responsive to said signals for computing the distance, in a direction substantially normal to said plane, between said plane and points from which reflections are received, a clearance limit control device providing a clearance signal representing a desired distance between said points and the vehicle, warning generator means for comparing the clearance signal with a signal representing said computed distance, a range azimuth indicator controlled from said radar and responsive to said warning generator for intensity modulating said indicator.

6. An aircraft-carried monopulse radar having means for transmitting an energy beam in a direction making a relatively small angle with a selected reference plane parallel to a plane which contains the flight path of said aircraft and having a pair of range and error receiving channels for signals reflected from a target illuminated by said beam, means for generating a signal indicative of range of said target, means for generating a reference signal indicative of a predetermined perpendicular distance of said radar from said reference plane, means for generating a signal indicative of said angle, means for generating a signal indicative of aircraft angle of attack, and computer means responsive to said signals for indicating the perpendicular distance of said target from said reference plane.

7. In combination with an aircraft, a terrain indicating system carried by the aircraft comprising a terrain viewing monopulse radar having a radiant energy pattern with lobes extending on either side of a centerline, said centerline making a relatively small angle with the terrain and extending at a predetermined relatively small depression angle with respect to a selected reference direction whereby said radiant energy pattern intersects the terrain well ahead of the aircraft, said radar having a pair of receiver channels for range and error signals from terrain features within said lobes, and means for computing according to said range and error signals and according to said predetermined depression angle the distance between said aircraft and energy reflecting terrain features below and ahead of the aircraft as measured in a direction normal to said reference direction.

8. In combination with an aircraft, a terrain indicating system carried by the aircraft comprising a terrain viewing monopulse radar having a radiant energy pattern with lobes extending on either side of a centerline, said centerline making a relatively small angle with the terrain and extending at a predetermined relatively small depression angle with respect to a selected reference direction whereby the energy pattern intersects the terrain well ahead of the aircraft, said radar having a pair of receiver channels for range and error signals from terrain features within said lobes, means for computing according to said range and error signals and according to said predetermined depression angle the distance between said radar and energy reflecting terrain features below and ahead of the aircraft as measured in a direction normal to said reference direction, a range azimuth indicator under control of said radar, and means responsive to said computing means for providing an intensity modulation signal to said indicator when said computed distance is less than a predetermined clearance distance.

9. Apparatus for warning the pilot of a low flying aircraft of the adequacy of ground clearance comprising means for transmitting radiant energy from the aircraft toward the ground in a pattern having lobes lying on either side of a centerline which extends at a relatively small angle below the flight path of the aircraft, means for comparing the terrain reflections received in the two lobes to provide range and error signals, means for providing a signal representing a predetermined clearance distance to said flight path, and means for employing said signals and said depression angle below the flight path to provide an indication of terrain features which lack a predetermined clearance distance with respect to said flight path.

10. For use with an aircraft adapted to be flown at a relatively low altitude, a terrain viewing system adapted to be carried by the aircraft comprising a monopulse radar having a radiant energy pattern with lobes extending on either side of a centerline which extends at a predetermined relatively small depression angle with respect to a selected reference direction, said radar having a pair of receiver channels for sum and error signals from terrain features within said lobes, means for generating a clearance plane signal representing a desired clearance distance from said reference direction to a clearance plane below the aircraft and parallel to said direction, a range azimuth indicator under control of said radar, and means responsive to said signals and to a signal representing said predetermined depression angle for operating said indicator to effect presentation of terrain features which extend above said clearance plane.

11. For use with an aircraft adapted to be flown at a relatively low altitude, a terrain viewing system adapted to be carried by the aircraft comprising a monopulse radar having a radiant energy pattern with lobes extending on either side of a centerline which extends at a predetermined relatively small depression angle with respect to a selected reference direction, said radar having an antenna stabilized relative to the flight path of the aircraft whereby said reference direction is parallel to said flight path, said radar having a pair of receiver channels for sum and error signals from terrain features within said lobes, means for generating a clearance plane signal representing a desired clearance distance from said reference direction to a clearance plane below the aircraft and parallel to said direction, a range azimuth indicator under control of said radar, and means responsive to said signals and to a signal representing said predetermined depression angle for operating said indicator to effect presentation of terrain features which extend above said clearance plane.

12. A ground-viewing aircraft-carried radar comprising means for transmitting wave energy obliquely toward ground in a relatively narrow beam having a center line and receiving reflections of such energy from the ground along two slightly divergent lobes symmetrical with said transmitter beam center line, means for simultaneously comparing strength of reflections in the two lobes to form a difference signal representing angle of divergence between reflected energy and the said center line, means for adding the angle between line of flight of the aircraft and beam center line to said divergence angle to provide an angle signal, and means for multiplying the angle signal by distance traveled by the reflection to give an indication of clearance between aircraft line of flight and ground obstructions ahead of the aircraft.

13. The apparatus of claim 12 including means for compensating the received signal strength for variations in range.

14. A ground-viewing aircraft-carried radar comprising means for transmitting wave energy obliquely toward ground in a relatively narrow beam having a center line and receiving reflection of such energy from the ground along two slightly divergent lobes symmetrical with said transmitter beam center line, means for simultaneously comparing strength of reflections in the two lobes to form a difference signal representing angle of divergence between reflected energy and the said center line, means for controlling the beam direction to maintain a fixed depression angle with respect to horizontal, means for adding the depression angle to the divergence angle to provide an angle signal, and means for multiplying the difference signal by distance traveled by the reflection to give an indication of clearance between the aircraft and ground obstruction.

15. The apparatus of claim 14 including means for summing the reflection in the two lobes, means for adjusting the effective strength of received reflection to maintain constant the strength of the sum of the reflection in the two lobes and means for accordingly adjusting the strength of the difference signal whereby it represents the ratio of difference to sum of reflections in the two lobes and the clearance indication is independent of range, ground obstacle area and ground obstacle reflection properties.

16. A profiloscope, comprising in combination with an aircraft, a radar system on the aircraft carried along its line of flight and having an antenna with a twin lobe radiation pattern, means for accomplishing simultaneous lobe comparison and means responsive thereto for producing a signal representing ratio of subtractive reception to additive reception with respect to the antenna lobes, and a computer for computing the algebraic sum of said ratio and the angle between antenna boresight and said line of flight and for multiplying said sum by range of received signals.

17. A profiloscope, comprising in combination with an aircraft, a radar system carried by the aircraft having an antenna with a twin lobe radiation pattern, means for accomplishing simultaneous lobe comparison and means responsive thereto for producing a signal representing ratio of subtractive reception to additive reception with respect to the antenna lobes, an attack angle computer, an antenna depression angle indicator, means responsive to said computer and indicator means for algebraically adding attack angle to the antenna depression angle to produce a computed signal representing angle between antenna boresight and line of flight, and means for multiplying said ratio and computed signal by range of received signals.

References Cited by the Examiner

UNITED STATES PATENTS

| | | | |
|---|---|---|---|
| 2,467,361 | 4/1949 | Blewett | 343—16.1 |
| 2,682,656 | 6/1954 | Phillips. | |
| 2,687,520 | 8/1954 | Fox et al. | 343—16.1 |
| 2,784,400 | 3/1957 | Ehrenfried. | |
| 2,817,835 | 12/1957 | Worthington. | |
| 2,831,969 | 4/1958 | Jankowski. | |
| 2,948,892 | 8/1960 | White | 343—16.1 |

OTHER REFERENCES

Schlieber: Radomes and Aircraft Design; Aeronautical Engineering Review; May 1952, pp. 69–81.

LEWIS H. MYERS, *Primary Examiner.*

FREDERICK M. STRADER, *Examiner.*

G. J. MOSSINGHOFF, *Assistant Examiner.*